United States Patent
Chen et al.

(10) Patent No.: US 10,405,273 B2
(45) Date of Patent: *Sep. 3, 2019

(54) ACCESS POINT (AP), STATION (STA) AND METHOD FOR SUBCARRIER SCALING

(71) Applicant: Intel IP Corporation, Santa Clara, CA (US)

(72) Inventors: Xiaogang Chen, Portland, OR (US); Qinghua Li, San Ramon, CA (US); Assaf Gurevitz, Ramat Hasharon (IL); Tzahi Weisman, Jerusalem (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,950

(22) Filed: Mar. 8, 2018

(65) Prior Publication Data

US 2018/0199283 A1 Jul. 12, 2018

Related U.S. Application Data

(63) Continuation of application No. 15/272,286, filed on Sep. 21, 2016, now Pat. No. 10,009,840.

(Continued)

(51) Int. Cl.
*H04W 52/00* (2009.01)
*H04W 52/02* (2009.01)
(Continued)

(52) U.S. Cl.
CPC ....... *H04W 52/0206* (2013.01); *H04L 5/0044* (2013.01); *H04L 5/0048* (2013.01);
(Continued)

(58) Field of Classification Search
CPC .............. H04L 5/0044; H04L 5/0048; H04W 52/0206; H04W 52/30; H04W 84/12
See application file for complete search history.

(56) References Cited

U.S. PATENT DOCUMENTS

| 10,009,840 B2 * | 6/2018 | Chen ................ H04W 52/0206 |
| 2012/0127899 A1 | 5/2012 | Ketchum et al. |

(Continued)

FOREIGN PATENT DOCUMENTS

| CN | 108702272 A | 10/2018 |
| WO | WO-2016010578 A1 | 1/2016 |

(Continued)

OTHER PUBLICATIONS

U.S. Appl. No. 15/272,286, filed Sep. 21, 2016, Access Point (AP), Station (STA) and Method for Subcarrier Scaling.

(Continued)

*Primary Examiner* — Benjamin H Elliott, IV
(74) *Attorney, Agent, or Firm* — Schwegman Lundberg & Woessner, P.A.

(57) ABSTRACT

Embodiments of an access point (AP), station (STA) and method for subcarrier scaling are generally described herein. The AP may transmit a high efficiency (HE) physical layer convergence procedure (PLCP) protocol data unit (PPDU) that includes a legacy long training field (L-LTF), a legacy signal (L-SIG) field, and an HE signal (HE-SIG) field. The HE-SIG may be based on HE-SIG symbols mapped to a group of HE subcarriers that includes legacy subcarriers and HE extension subcarriers. The L-LTF may be based on L-LTF pilot symbols mapped to the legacy subcarriers. The L-SIG may be based on L-SIG legacy symbols mapped to the legacy subcarriers and L-SIG extension pilot symbols mapped to the HE extension subcarriers. The AP may scale a per-subcarrier power of the L-SIG extension pilot symbols to match a per-subcarrier power of the L-LTF pilot symbols.

20 Claims, 6 Drawing Sheets

Related U.S. Application Data (60) Provisional application No. 62/305,575, filed on Mar. 9, 2016.

(51) Int. Cl.
  *H04L 5/00* (2006.01)
  *H04W 52/34* (2009.01)
  *H04W 84/12* (2009.01)

(52) U.S. Cl.
  CPC .......... *H04W 52/346* (2013.01); *H04W 84/12* (2013.01); *Y02D 70/00* (2018.01); *Y02D 70/122* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/22* (2018.01); *Y02D 70/26* (2018.01)

(56) References Cited

U.S. PATENT DOCUMENTS

| | | |
|---|---|---|
| 2015/0139206 A1 | 5/2015 | Azizi et al. |
| 2015/0195112 A1 | 7/2015 | Jones, IV et al. |
| 2017/0048844 A1* | 2/2017 | Chen ................ H04W 72/0413 |
| 2017/0048882 A1 | 2/2017 | Li et al. |
| 2017/0099089 A1 | 4/2017 | Liu et al. |
| 2017/0126456 A1 | 5/2017 | Lee et al. |
| 2017/0264413 A1 | 9/2017 | Azizi et al. |
| 2017/0265129 A1 | 9/2017 | Chen et al. |
| 2018/0199283 A1* | 7/2018 | Chen ................ H04W 52/0206 |

FOREIGN PATENT DOCUMENTS

| | | |
|---|---|---|
| WO | WO-2017155649 A2 | 9/2017 |
| WO | WO-2017155649 A3 | 9/2017 |

OTHER PUBLICATIONS

"U.S. Appl. No. 15/272,286, Notice of Allowance dated Feb. 8, 2018", 12 pgs.

"IEEE Standard 802.11b-1999", (1999), 1-89.

"International Application Serial No. PCT/US2017/016709, International Search Report dated May 16, 2017", 7 pgs.

"International Application Serial No. PCT/US2017/016709, Written Opinion dated May 16, 2017", 7 pgs.

Kim, Kyung Jun, "Multi-user massive MIMO fornext-generation WLAN systems", Electronics Letters, vol. 51, Issue: 10, (May 14, 2015), 792-794.

"International Application Serial No. PCT/US2017/016709, International Preliminary Report on Patentability dated Sep. 20, 2018", 7 pgs.

* cited by examiner

ACCESS POINT (AP), STATION (STA) AND METHOD FOR SUBCARRIER SCALING

PRIORITY CLAIM

This application is a continuation of U.S. patent application Ser. No. 15/272,286, filed Sep. 21, 2016, claims priority under 35 USC 119(e) to U.S. Provisional Patent Application Ser. No. 62/305,575, filed Mar. 9, 2016, each of which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi communications. Some embodiments relate to boosting and/or power scaling of pilot subcarriers and/or data subcarriers. Some embodiments relate to range extension mode.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
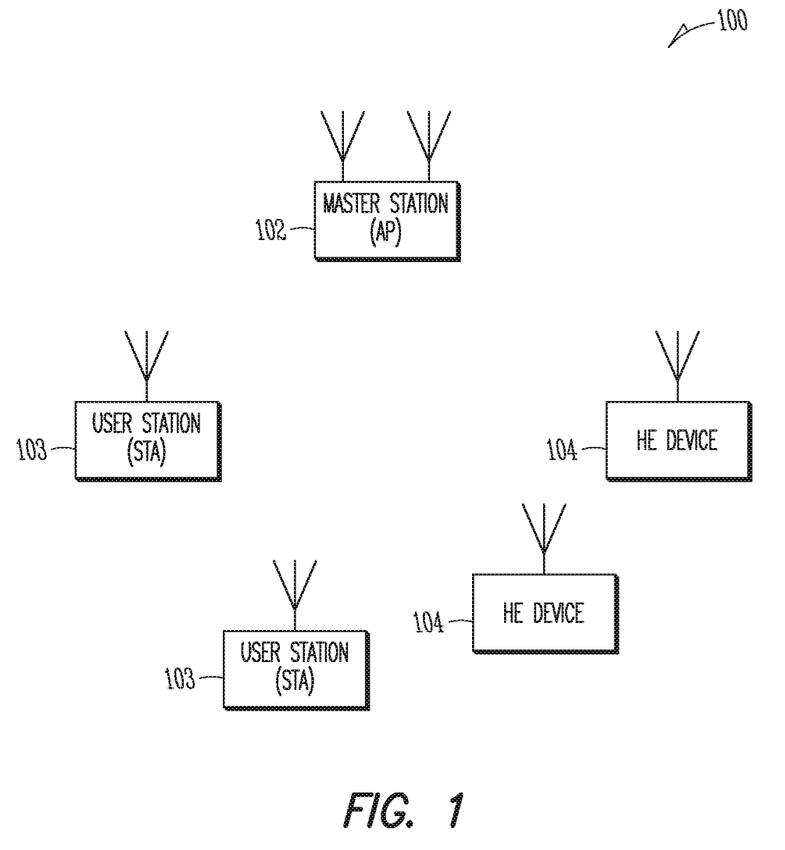
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support HE devices in some cases, non HE devices in some cases, and a combination of HE devices and non HE devices in some cases. Accordingly, it is understood that although techniques described herein may refer to either a non HE device or to an HE device, such techniques may be applicable to both non HE devices and HE devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may transmit an HE physical layer convergence procedure (PLCP) protocol data unit (PPDU) to an STA 103. The HE PPDU may include control fields and/or data fields, in some cases. The STA 103 may receive the HE PPDU and may perform operations such as channel estimation or others as part of decoding data fields of the HE PPDU. The STA 103 may transmit uplink HE PPDUs to the AP, in some embodiments. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HE device 104 and/or other device may be configurable to operate as a master station. Accordingly, in such embodiments, operations that may be performed by the AP 102 as described herein may be performed by the STA 103, HE device 104 and/or other device that is configurable to operate as the master station.

In some embodiments, one or more of the STAs 103 may be legacy stations. These embodiments are not limiting, however, as the STAs 103 may be configured to operate as HE devices 104 or may support HE operation in some embodiments. The master station 102 may be arranged to communicate with the STAs 103 and/or the HE stations 104 in accordance with one or more of the IEEE 802.11 standards, including 802.11ax and/or others. In accordance with some HE embodiments, an access point (AP) may operate as the master station 102 and may be arranged to contend for a wireless medium (e.g., during a contention period) to receive exclusive control of the medium for an HE control period (i.e., a transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HE control period, the master station 102 may communicate with HE stations 104 using one or more HE PPDUs. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HE communication may be configured for transmitting a number of spatial streams.

In some embodiments, high-efficiency (HE) wireless techniques may be used, although the scope of embodiments is not limited in this respect. As an example, techniques included in 802.11ax standards and/or other standards may be used. In accordance with some embodiments, a master station 102 and/or HE stations 104 may generate an HE packet in accordance with a short preamble format or a long preamble format. The HE packet may comprise a legacy signal field (L-SIG) followed by one or more HE signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
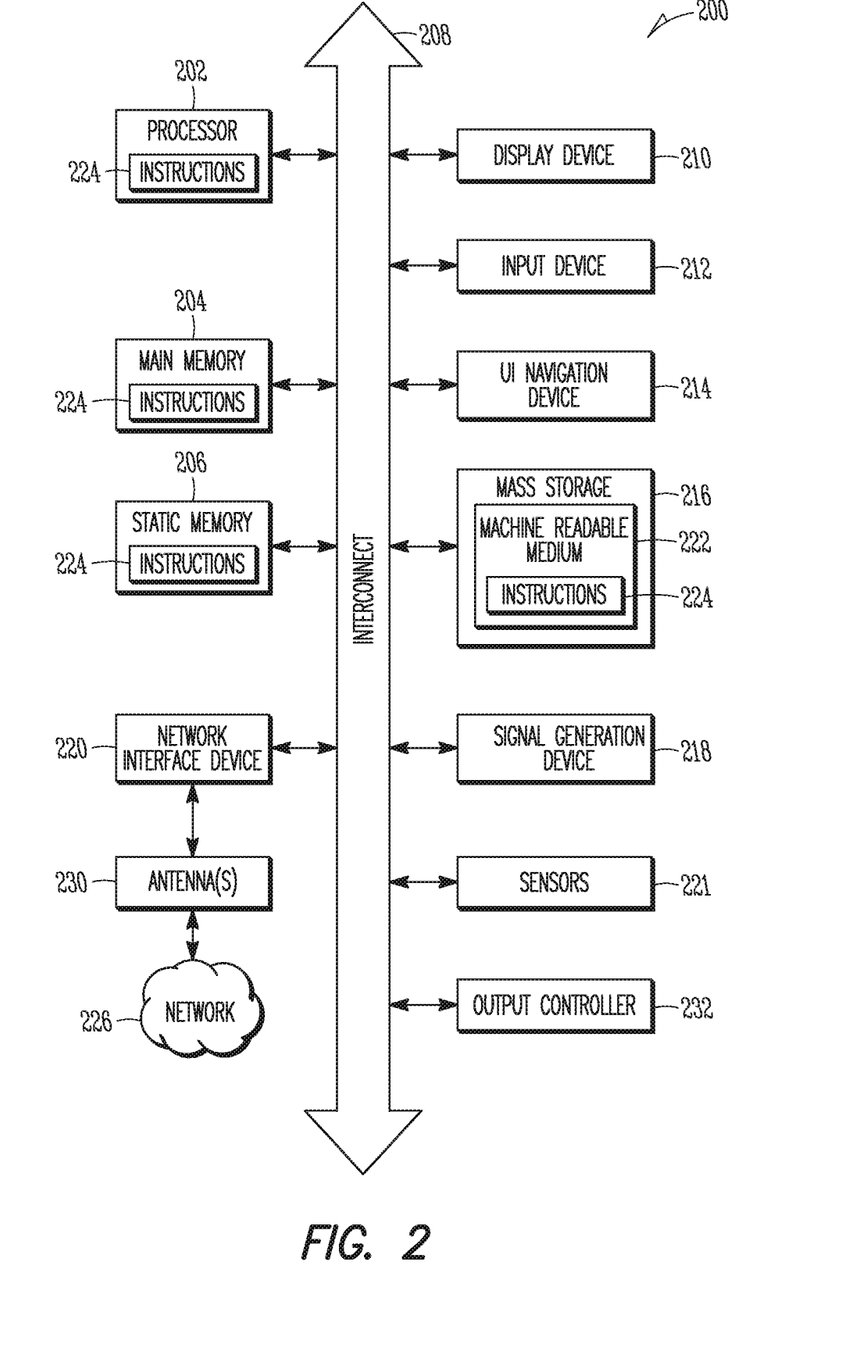
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HE device, HE AP, HE STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208.

The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
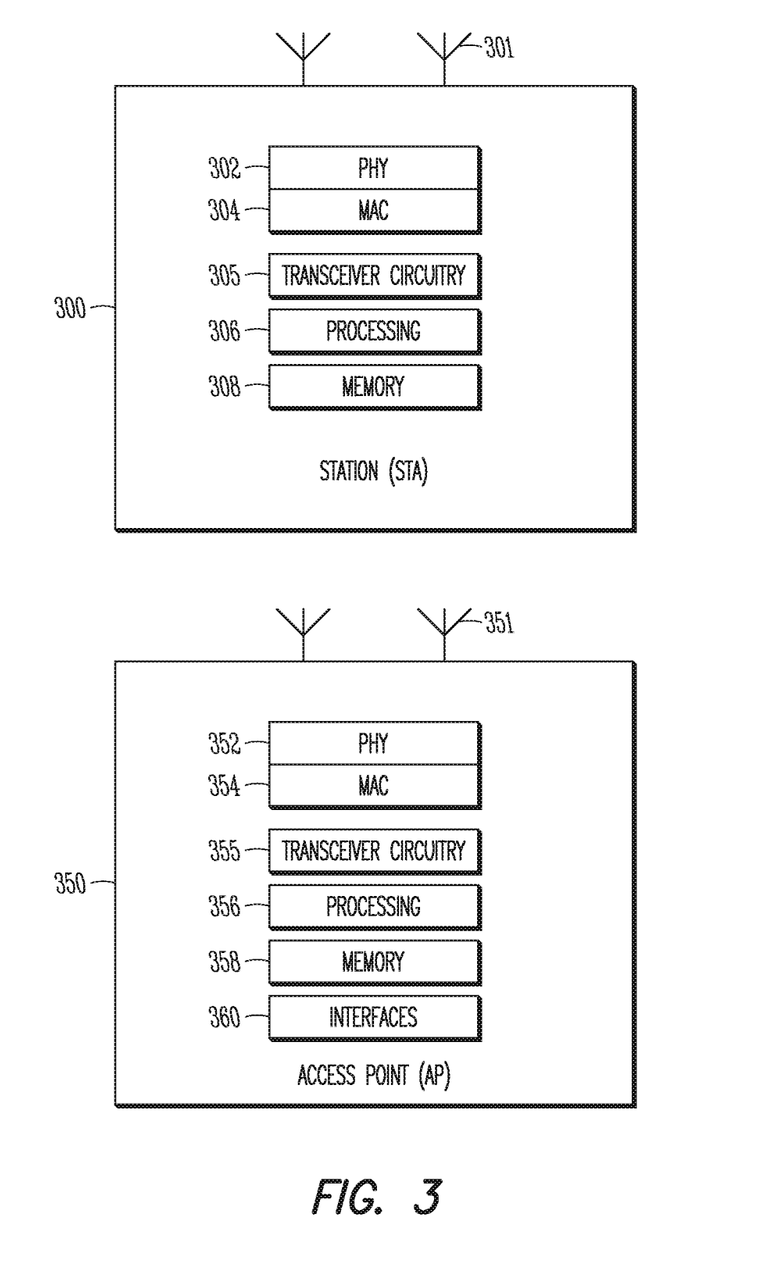
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HE device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HE device 104 may be configured to communicate using OFDM communication signals over a multicarrier communication channel. Accordingly, in some cases, the STA 300, AP 350 and/or HE device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards, although the scope of the embodiments is not limited in this respect as they may also be suitable to transmit and/or receive communications in accordance with other techniques and standards. In some other embodiments, the AP 350, HE device 104 and/or the STA 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In accordance with some embodiments, the AP 102 may transmit a high efficiency (HE) physical layer convergence procedure (PLCP) protocol data unit (PPDU) that may include a legacy long training field (L-LTF), a legacy signal (L-SIG) field, and an HE signal (HE-SIG) field. The HE-SIG may be based on HE-SIG symbols mapped to a group of HE subcarriers that includes legacy subcarriers and HE extension subcarriers. The L-LTF may be based on L-LTF pilot symbols mapped to the legacy subcarriers. The L-SIG may be based on L-SIG legacy symbols mapped to the legacy subcarriers and L-SIG extension pilot symbols mapped to the HE extension subcarriers. The AP 102 may scale a per-subcarrier power of the L-SIG extension pilot symbols to match a per-subcarrier power of the L-LTF pilot symbols. These embodiments will be described in more detail below.

Figure 4:
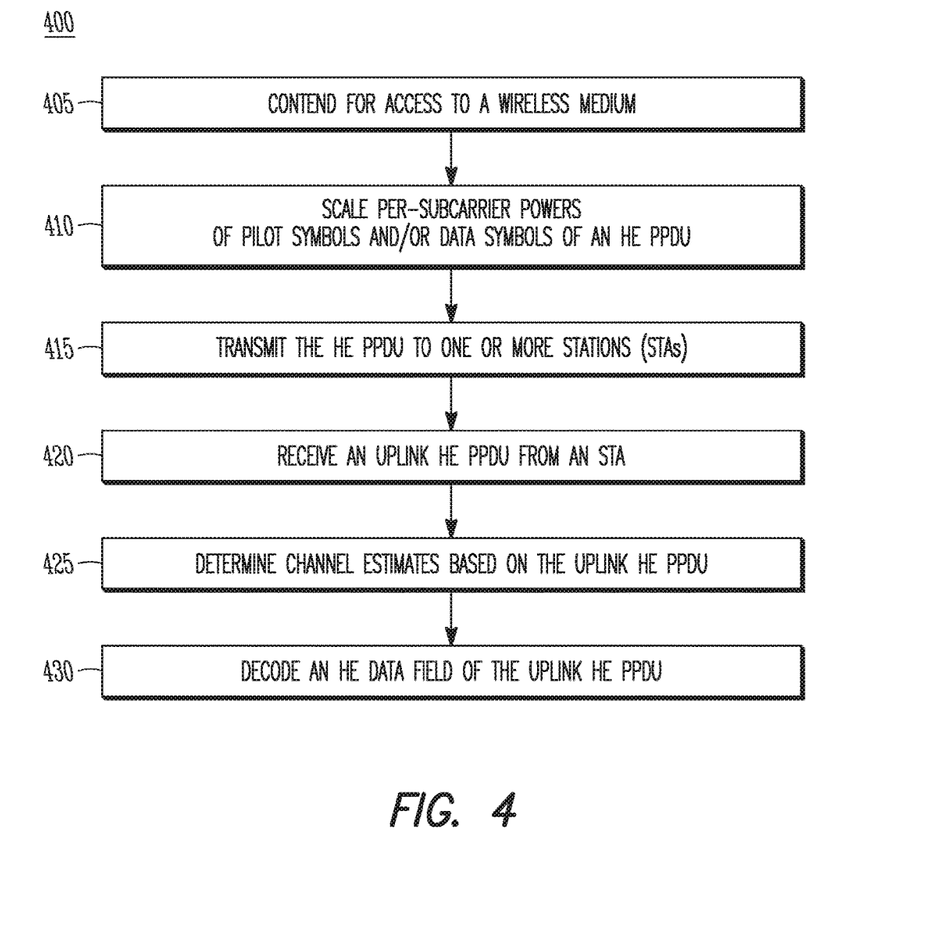
FIG. 4 illustrates the operation of a method of communication in accordance with some embodiments.

FIG. 4 illustrates the operation of a method of communication in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-6, although it is understood that the method 400 may be practiced with any other suitable systems, interfaces and components.

In some embodiments, the STA 103 may be configurable to operate as an HE device 104. Although reference may be made to an STA 103 herein, including as part of the descriptions of the method 400 and/or other methods described herein, it is understood that an HE device 104 and/or STA 103 configurable to operate as an HE device 104 may be used in some embodiments. In addition, the method 400 and other methods described herein may refer to STAs 103, HE devices 104 and/or APs 102 operating in accordance with one or more standards and/or protocols, such as 802.11, Wi-Fi, wireless local area network (WLAN) and/or other, but embodiments of those methods are not limited to just those devices. In some embodiments, the method 400 and other methods described herein may be practiced by other mobile devices, such as an Evolved Node-B (eNB) or User Equipment (UE). The method 400 and other methods described herein may also be practiced by wireless devices configured to operate in other suitable types of wireless communication systems, including systems configured to operate according to various Third Generation Partnership Project (3GPP) Long Term Evolution (LTE) standards. The method 400 may also be applicable to an apparatus for an STA 103, HE device 104 and/or AP 102 or other device described above, in some embodiments.

Figure 6:
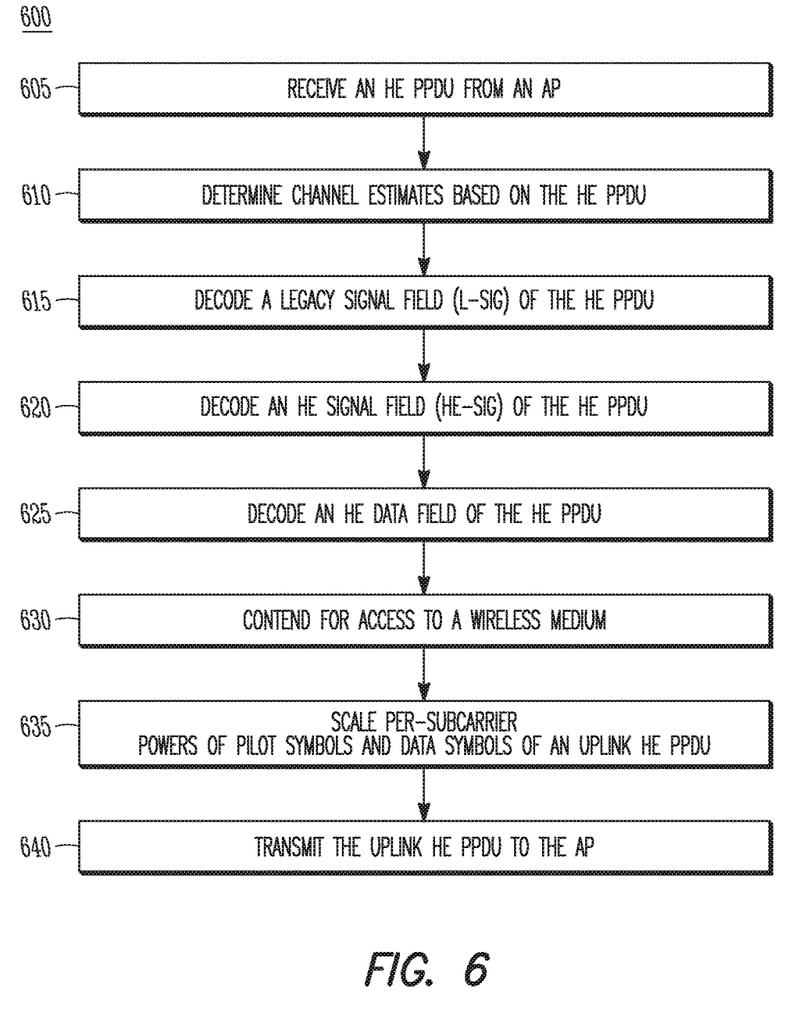
FIG. 6 illustrates the operation of another method of communication in accordance with some embodiments.

It should also be noted that embodiments are not limited by references herein (such as in descriptions of the methods 400, 600 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 405 of the method 400, the AP 102 may contend for access to a wireless medium. In some embodiments, the AP 102 may contend for the wireless medium during a contention period to receive exclusive control of the medium during a period, including but not limited to an HE control period. The AP 102 may transmit a frame and/or message, such as an HE PPDU to be described below, during the HE control period, in some embodiments. It should be noted, however, that embodiments are not limited to transmission during an HE control period or transmission in accordance with the exclusive control of the medium. Accordingly, the HE PPDU and/or other frame may be transmitted in contention-based scenarios and/or other scenarios, in some cases.

At operation 410, the AP 102 may scale pilot subcarriers, data subcarriers and/or other subcarriers of an HE PPDU that is to be transmitted to one or more STAs 103. At operation 415, the AP 102 may transmit the HE PPDU to the one or more STAs 103. In some embodiments, the HE PPDU may be transmitted in accordance with orthogonal frequency division multiple access (OFDMA) techniques and/or orthogonal frequency division multiplexing (OFDM) techniques. The scope of embodiments is not limited in this respect, however, as other techniques may be used, including but not limited to single carrier frequency division multiple access (SC-FDMA) signals and/or other techniques.

It should be noted that HE PPDUs, such as high efficiency (HE) physical layer convergence procedure (PLCP) protocol data unit (PPDU) and/or others, may be exchanged between the AP 102 and one or more STAs 103, in some embodiments. The scope of embodiments is not limited in this respect, however, as the fields described for the HE PPDUs may be exchanged using other frames and/or other types of frames, in some embodiments.

Figure 5:
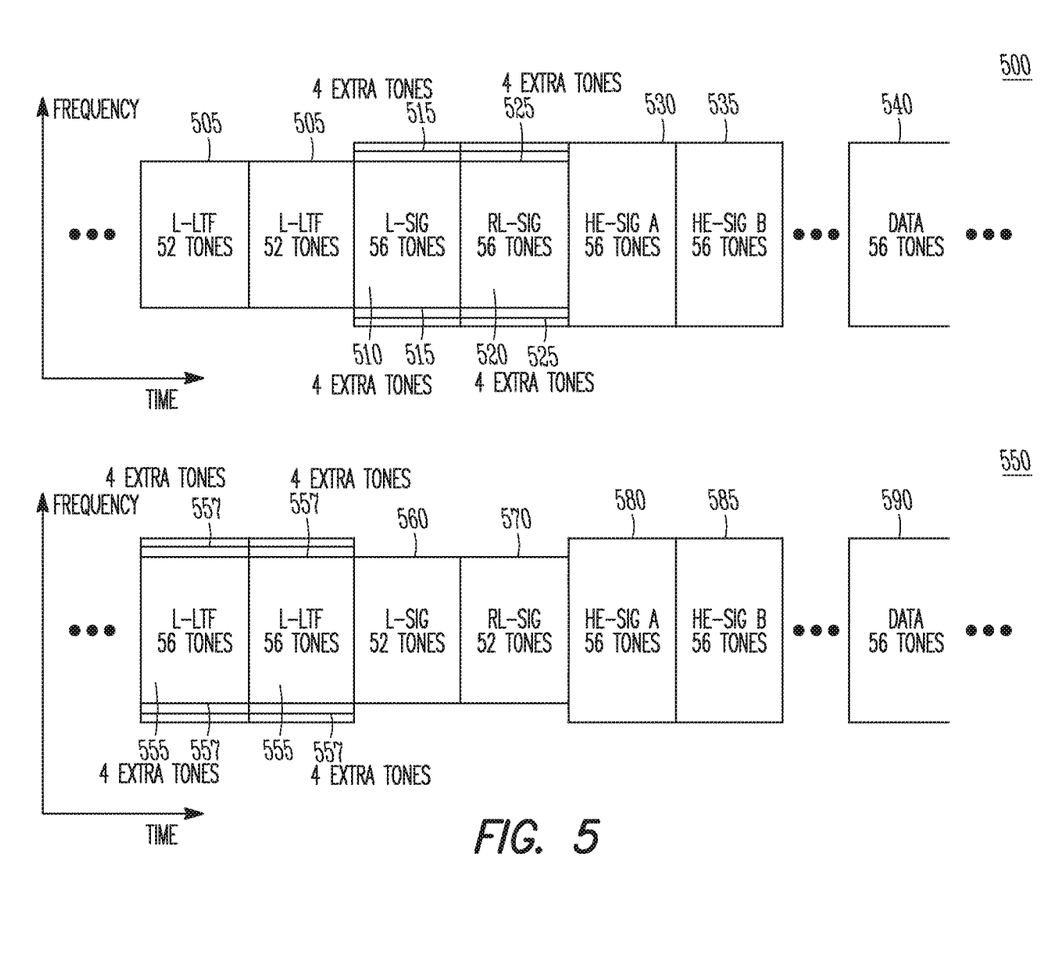
FIG. 5 illustrates example packets that may be exchanged in accordance with some embodiments.

In some embodiments, an HE PPDU may include one or more of a legacy short training field (L-STF), legacy long training field (L-LTF), legacy signal field (L-SIG), repeated L-SIG (RL-SIG), HE signal field (such as HE-SIG-A and/or HE-SIG-B), one or more HE data fields and/or other fields. As an example, the HE PPDU may include an L-STF, L-LTF, L-SIG, RL-SIG, HE-SIG-A, HE-SIG-B, and one or more HE data fields. It should also be noted that references herein to transmission of the HE PPDU and/or one or more fields of the HE PPDU are not limiting. In some embodiments, the HE PPDU may be generated for transmission by the AP 102 to one or more STAs 103. In some embodiments, one or more fields (such as an L-STF, L-LTF, L-SIG, RL-SIG, HE-SIG-A, HE-SIG-B, one or more HE data fields and/or one or more other fields) may be encoded by the AP 102 and may be included in the HE PPDU 500.

In some embodiments, the L-STF may be based on L-STF pilot symbols, which may enable channel estimation and/or channel tracking by one or more STAs 103. In some embodiments, the L-LTF may be based on L-LTF pilot symbols, which may enable channel estimation and/or channel tracking by one or more STAs 103. In some embodiments, the L-SIG may be based on L-SIG legacy symbols, which may include data symbols, pilot symbol(s) or a combination thereof. As a non-limiting example, 52 L-SIG legacy symbols may include 48 L-SIG legacy data symbols and 4 L-SIG legacy pilot symbols. The L-SIG may also be based on L-SIG extension pilot symbols, in some cases. For instance, as will be described below, four L-SIG extension pilot symbols may be used. The L-SIG legacy data symbols may be used to indicate information related to reception in accordance with legacy techniques, in some cases. The L-SIG legacy pilot symbols may be used to enable channel estimation and/or channel tracking by one or more STAs 103, such as in a portion of the legacy subcarriers, in some cases. The L-SIG extension pilot symbols may be used to enable channel estimation and/or channel tracking by one or more STAs 103, such as in the HE extension subcarriers, in some cases. As a non-limiting example, the L-SIG extension pilot symbols may enable a determination, by one or more STAs 103, of an extended channel estimate of both the legacy subcarriers and the HE extension subcarriers in comparison to a legacy channel estimate of the legacy subcarriers based on the L-LTF pilot symbols, in some cases. In some embodiments, the RL-SIG may be a repetition of the L-SIG, although the scope of embodiments is not limited in this respect. The RL-SIG may be of a same structure or similar structure as the L-SIG, in some embodiments. For instance, the RL-SIG may be the same or similar to the L-SIG in terms of number, type, arrangement, power scaling and/or other aspects of pilot symbols, extension pilot symbols, data symbols, subcarriers and/or other elements, in some embodiments.

In some embodiments, the HE-SIG, HE-SIG-A and/or HE-SIG-B may be based on HE-SIG pilot symbols and/or HE-SIG data symbols. The HE-SIG pilot symbols may enable channel estimation and/or channel tracking by one or more STAs 103, in some embodiments. Other operations related to decoding, demodulation, synchronization and/or other may be enabled, in some cases. The HE-SIG data symbols may be used, in some embodiments, to communicate data and/or control information. For instance, control information related to reception of HE data fields may be communicated by the HE-SIG data symbols It should be noted that these examples of operations that may be enabled by symbols of the L-STF, L-LTF, L-SIG, RL-SIG, HE-SIG, HE-SIG-A and/or HE-SIG-B are not limiting, as other operations, such as operations related to decoding, demodulation, synchronization and/or other, may also be enabled by those symbols. In addition, the symbols may communicate control information and/or data, in some embodiments.

In some embodiments, symbol periods (such as OFDM symbol periods) may be allocated for the above fields. For instance, the L-STF may be transmitted in an L-STF symbol period of the HE PPDU, the L-LTF may be transmitted in an L-LTF symbol period of the HE PPDU, the L-SIG may be transmitted in an L-SIG symbol period of the HE PPDU, the HE-SIG may be transmitted in an HE-SIG symbol period of the HE PPDU, the HE-SIG-A may be transmitted in an HE-SIG-A symbol period of the HE PPDU, the HE-SIG-B may be transmitted in an HE-SIG-B symbol period of the HE PPDU, and/or an HE data field may be transmitted in a group of one or more HE data symbol periods of the HE PPDU.

In some embodiments, a group of legacy subcarriers may be used for transmission of one or more fields of the HE PPDU. In addition, one or more fields may be transmitted in a group of HE subcarriers that may include the legacy subcarriers and may further include a group of HE extension subcarriers. Accordingly, channel resources used for legacy communication (the legacy subcarriers) may be extended for HE communication. A group of HE subcarriers used for HE communication may include the legacy subcarriers and may also include a group of HE extension subcarriers.

In some embodiments, the L-LTF may be based on L-LTF pilot symbols mapped to the group of legacy subcarriers in an L-LTF symbol of the HE PPDU. In some embodiments, the L-SIG may be based on L-SIG legacy symbols mapped to the legacy subcarriers in an L-SIG symbol of the HE PPDU. It should be noted that the L-SIG legacy symbols may include L-SIG legacy data symbols, L-SIG legacy pilot symbols or a combination thereof, in some cases. The L-SIG may be further based on L-SIG extension pilot symbols mapped to the HE extension subcarriers in the L-SIG symbol of the HE PPDU. A per-subcarrier power of the L-SIG extension pilot symbols may be scaled to match a per-subcarrier power of the L-LTF pilot symbols. It should be noted that similar techniques may be used for an RL-SIG, if present in the HE PPDU.

In some embodiments, the HE-SIG may be based on HE-SIG symbols mapped to the group of HE subcarriers (which may include the legacy subcarriers and the group of HE extension subcarriers).

As a non-limiting example, channel resources may include a number of subcarriers of predetermined bandwidth of 312.5 kHz. Accordingly, channel resources of 20 MHz may include 64 sub-carriers allocated as guard-bands, used subcarriers, DC subcarrier(s), data subcarriers, pilot subcarriers and/or other subcarriers. The group of legacy subcarriers may include 52 subcarriers, the group of HE extension subcarriers may include 4 subcarriers, and the group of HE subcarriers may include 56 subcarriers.

In symbol periods in which a configuration for the legacy sub-carriers is used, the channel resources may include a lower guard band at a lower edge of the channel resources, followed by 26 legacy subcarriers, followed by a DC subcarrier, followed by 26 legacy subcarriers, followed by an upper guard band at an upper edge of the channel resources. In symbol periods in which a configuration for the HE sub-carriers is used, the channel resources may include a lower guard band at a lower edge of the channel resources, followed by two HE extension subcarriers, followed by 26 legacy subcarriers, followed by a DC subcarrier, followed by 26 legacy subcarriers, followed by two HE extension sub-carriers, followed by an upper guard band at an upper edge of the channel resources. Accordingly, a portion of each guard band of the legacy configuration may be used for the HE extension subcarriers of the HE configuration, in some cases.

The HE PPDU may not necessarily include all of the fields described above, in some embodiments. In some cases, the fields may appear in the chronological order described above, but embodiments are not limited as such. In addition, the HE PPDU may include more than one of any of the fields described above, in some embodiments.

The pilot symbols and/or data symbols may be scaled in some embodiments. Different scaling techniques may be used. As an example, a per-subcarrier power of the L-SIG extension pilot symbols may be scaled to match a per-subcarrier power of the L-LTF pilot symbols. Accordingly, pilot symbols for the legacy subcarriers and the HE extension subcarriers may be transmitted as a same per-subcarrier power, in this example.

Continuing the example, the L-LTF pilot symbols may be scaled for equal per-subcarrier power, in some cases. Accordingly, when 52 legacy subcarriers are used, each L-LTF pilot symbol may be scaled by a factor of 1/52 with respect to a total power of the L-LTF symbol period. For instance, each L-LTF pilot symbol may be scaled for a power of $P*(1/52)$ when a target total power (and/or normalized power restriction) of the L-LTF symbol period is P. When the L-SIG extension pilot symbols are scaled to match the per-subcarrier power of the L-LTF pilot symbols, each L-SIG extension pilot symbol may be scaled for a power of $P*(1/52)$.

Continuing the example, a per-subcarrier power of the L-SIG legacy symbols may also be scaled based on various criteria. In some embodiments, a normalized power restriction for the L-SIG symbol period may be used, and the L-SIG legacy symbols may be scaled (along with the scaling of the L-SIG extension pilot symbols) in accordance with the power restriction. As an example, when the L-SIG symbol period and the L-LTF symbol period are to be normalized to the same total power (such as P), the per-subcarrier power of the L-SIG legacy symbols may be scaled by a product of (1/52) and (48/52) with respect to the total power of the L-SIG symbol period. That is, a scaling factor of (48/2704) may be used. In addition, the per-subcarrier power of the L-SIG extension pilot symbols may be scaled by a factor of (1/52) with respect to the total power of the L-SIG symbol period. It should be noted that, in this case, the L-SIG extension pilot symbols may be boosted, with respect to the L-SIG legacy symbols, by a factor of 52/48 (0.347 dB) to match the per-subcarrier power of the L-LTF pilot symbols.

The above example, in which the L-LTF symbols and the L-SIG symbols are scaled for the same total power for the L-LTF symbol period and the L-SIG symbol period, may be applicable to a normal mode of operation, a non-extended coverage mode, a normal HE PPDU and/or non-extended coverage HE PPDU. As another example, for an extended coverage mode (and/or extended coverage HE PPDU), the total power of the L-LTF symbol period may be twice that of the L-SIG symbol period (3.01 dB higher). Embodiments are not limited to the particular ratio of two (3.01 dB) between the total powers of the L-LTF symbol period and the L-SIG symbol period, however, as any suitable ratio may be used.

In the extended coverage case described above, various subcarrier scaling operations will be described below using total powers of P and 2P for the L-SIG symbol period and the L-LTF symbol period, respectively. Each L-LTF pilot symbol may be scaled for a power of 2P*(1/52) when a target total power (and/or normalized power restriction) of the L-LTF symbol period is 2P. When the L-SIG extension pilot symbols are scaled to match the per-subcarrier power of the L-LTF pilot symbols, each L-SIG extension pilot symbol may be scaled for a power of 2P*(1/52). In addition, the L-SIG legacy symbols may be scaled for a power of P*(1/52)*(44/52). That is, a scaling factor of (44/2704) may be used. Accordingly, the L-SIG extension pilot symbols may be scaled (by a factor of (2/52) with respect to the total power of the L-SIG symbol period) to match the per-subcarrier power of the L-LTF symbol period. The per-subcarrier power of the L-SIG legacy symbols may be scaled by a product of (1/52) and (44/52) with respect to the total power of the L-SIG symbol period. That is, a scaling factor of (44/2704) may be used. It should be noted that the L-SIG extension pilot symbols may be boosted, with respect to the L-SIG legacy symbols, by a factor of 52/22 (0.347 dB) to match the per-subcarrier power of the L-LTF pilot symbols.

As another example, a per-subcarrier power of the HE-SIG symbols may be scaled to match the per-subcarrier power of the L-LTF pilot symbols and the per-subcarrier power of the L-SIG extension pilot symbols.

As another example, when the HE PPDU is generated for an extended coverage mode, the target symbol power of a legacy short training field (L-STF) and/or L-LTF may be boosted by 3 dB (or any suitable scaling in dB or scalar scaling) relative to a target symbol power of the HE-SIG (such as HE-SIG-A and/or other). The extra four tones of the L-SIG and/or RL-SIG on the edge of the channel resources (in a 20 MHz band or otherwise) may be scaled to have the same per-tone transmission power as the per-tone transmission power of L-LTF tones. In addition, other populated tones in the L-SIG and/or RL-SIG (such as legacy tones and/or other) may be scaled to have a 3 dB (or any suitable scaling in dB or scalar scaling) lower per-tone transmission power than the per-tone transmission power of the L-LTF tones.

At operation 420, the AP 102 may receive an uplink HE PPDU from an STA 103. The AP 102 may determine channel estimates based on the uplink HE PPDU at operation 425. At operation 430, the AP 102 may decode one or more HE data fields of the uplink HE PPDU. In some embodiments, some or all of the concepts and/or techniques described herein regarding the transmission of the HE PPDU by the AP 102 may be applicable to an uplink HE PPDU transmitted by an STA 103 and received by the AP 102. For instance, concepts such as scaling operations, legacy subcarriers, HE subcarriers, HE extension subcarriers, data symbol, pilot symbols, extension pilot symbols and/or others described for the HE PPDU transmitted by the AP 102 may be applicable to the uplink HE PPDU, in some cases.

FIG. 5 illustrate example frames that may be exchanged in accordance with some embodiments. It should be noted that the examples 500, 550 shown in FIG. 5 may illustrate some or all of the concepts and techniques described herein in some cases, but embodiments are not limited by the examples 500, 550. For instance, embodiments are not limited by the name, number, type, size, ordering, arrangement and/or other aspects of the frames, signals, fields, data blocks, control headers, tones, subcarriers, channel resources and other elements as shown in FIG. 5. Although some of the elements shown in the examples of FIG. 5 may be included in an 802.11 standard and/or other standard, embodiments are not limited to usage of such elements that are included in standards.

The example HE PPDUs 500 and/or 550 illustrated in FIG. 5 may be transmitted by the AP 102 to one or more STAs 103. In some embodiments, the HE PPDUs 500 and/or 550 may be used by STAs 103 for uplink communication with the AP 102. It is understood that, in some embodiments, the HE PPDUs 500 and/or 550 may not necessarily include all of the fields shown in FIG. 5 and may even include additional fields in some cases.

In addition, the HE PPDUs 500 and/or 550 may be generated for transmission by the AP 102 to one or more STAs 103, in some embodiments. One or more fields described below (and/or others) may be encoded by the AP 102 and may be included in the HE PPDU 500 and/or 550, in some embodiments.

The HE PPDU 500 may include one or more L-LTFs 505 which may be transmitted using 52 tones. The L-LTFs 505 may be based on L-LTF pilot symbols, in some cases. The HE PPDU 500 may further include an L-SIG 510, which may be transmitted using 56 tones, which may include 52 tones and 4 extra tones 515. The L-SIG 510 may be based on legacy L-SIG symbols, which may include legacy L-SIG pilot symbols and/or legacy L-SIG data symbols, in some cases. The L-SIG 510 may be further based on extra pilot symbols (such as L-SIG extension pilot symbols), such as in the symbols mapped to the 4 extra tones 515. The HE PPDU 500 may further include an RL-SIG 520, which may be of a same or similar format as the L-SIG 510, and may be a repetition of the L-SIG 510 in some cases. The RL-SIG 520 may be transmitted using 56 tones, which may include 52 tones and 4 extra tones 525. The RL-SIG 520 may be based on legacy RL-SIG symbols, which may include legacy RL-SIG pilot symbols and/or legacy RL-SIG data symbols, in some cases. The HE PPDU 500 may further include an HE-SIG-A 530, which may be transmitted using 56 tones. The HE PPDU 500 may further include an HE-SIG-B 535, which may be transmitted using 56 tones. The HE-SIG-A 530 and/or HE-SIG-B 535 may include control information for one or more data fields 540 (such as HE data fields) of the HE PPDU 500, in some cases. The HE PPDU 500 may further include one or more data fields 540, such as HE data fields, which may be transmitted using 56 tones.

The HE PPDU 550 may include one or more L-LTFs 555 which may be transmitted using 56 tones. The L-LTFs 555 may be based on L-LTF pilot symbols, in some cases. The HE PPDU 550 may further include an L-SIG 560, which may be transmitted using 52 tones. The L-SIG 560 may be based on legacy L-SIG symbols, which may include legacy L-SIG pilot symbols and/or legacy L-SIG data symbols, in some cases. The HE PPDU 550 may further include an RL-SIG 570, which may be of a same or similar format as the L-SIG 560, and may be a repetition of the L-SIG 560 in some cases. The RL-SIG 570 may be transmitted using 52 tones. The RL-SIG 570 may be based on legacy RL-SIG symbols, which may include legacy RL-SIG pilot symbols and/or legacy RL-SIG data symbols, in some cases. The HE PPDU 550 may further include an HE-SIG-A 580, which may be transmitted using 56 tones. The HE PPDU 550 may further include an HE-SIG-B 585, which may be transmitted using 56 tones. The HE-SIG-A 580 and/or HE-SIG-B 585 may include control information for one or more data fields 590 (such as HE data fields) of the HE PPDU 550, in some cases. The HE PPDU 550 may further include one or more data fields 590, such as HE data fields, which may be transmitted using 56 tones.

It should be noted that in the HE PPDU 500, the 4 extra tones 515, 525 are included as part of the L-SIG 510 and RL-SIG 520, respectively, and are excluded from the L-LTFs 505. In the HE PPDU 550, the 4 extra tones 557 are included as part of the L-LTF 555 and are excluded from the L-SIG 560 and RL-SIG 570. In some embodiments, scaling techniques described herein for embodiments in which extra tones (such as L-SIG extension pilot symbols) are included as part of the L-SIG, may be used and/or may be modified for usage in embodiments in which extra tones are included as part of the L-LTF.

It should be noted that some embodiments may not necessarily include all operations shown in FIG. 4. As an example, some embodiments may include operations 405-415 but may exclude operations 420-430, such as when downlink transmission of HE PPDUs is performed and uplink reception of HE PPDUs (transmitted by one or more STAs 103) is not performed. As another example, some embodiments may exclude operations 405-415 but may include operations 420-430, such as when downlink transmission of HE PPDUs is not performed and uplink reception of HE PPDUs (transmitted by one or more STAs 103) is performed.

It should also be noted that in some cases, frames and/or elements (including but not limited to those in FIG. 5) may be transmitted in accordance with contention based techniques. In some embodiments, a transmission of a frame and/or element may be performed after detection of an inactivity period of the channel to be used for the transmission. For instance, it may be determined, based on channel sensing, that the channel is available. As a non-limiting example, a minimum time duration for the inactivity period may be based on an inter-frame spacing (IFS), which may be included in an 802.11 standard and/or other standard. That is, when inactivity is detected for a time duration that is greater than or equal to the IFS, the channel may be determined to be available. Embodiments are not limited to usage of the IFS, however, as other time durations, which may or may not be included in a standard, may be used in some cases. In addition, back-off techniques may also be used, in some embodiments.

FIG. 6 illustrates the operation of another method of communication in accordance with some embodiments. As mentioned previously regarding the method 400, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5, although it is understood that the method 600 may be practiced with any other suitable systems, interfaces and components. In addition, embodiments of the method 600 may be applicable to APs 102, STAs 103, UEs, eNBs or other wireless or mobile devices. The method 600 may also be applicable to an apparatus for an AP 102, STA 103 and/or other device described above.

It should be noted that the method 600 may be practiced by an STA 103 and may include exchanging of elements, such as frames, signals, messages, fields and/or other elements, with an AP 102. Similarly, the method 400 may be practiced at an AP 102 and may include exchanging of such elements with an STA 103. In some cases, operations and techniques described as part of the method 400 may be relevant to the method 600. In addition, embodiments of the method 600 may include operations performed at the STA 103 that are reciprocal to or similar to other operations described herein performed at the AP 102. For instance, an operation of the method 600 may include reception of a frame from the AP 102 by the STA 103 while an operation of the method 400 may include transmission of the same frame or similar frame by the AP 102.

In addition, previous discussion of various techniques and concepts may be applicable to the method 600 in some cases, including HE PPDUs, L-LTFs, S-LTFs, L-SIGs, RL-SIGs, HE-SIGs, HE-SIG-As, HE-SIG-Bs, HE data frames, legacy subcarriers, HE subcarriers, HE extension subcarriers, extra tones, extra pilots, scaling of per-subcarrier powers, scaling of a power of a symbol period, matching of per-subcarrier powers for different symbol periods, boosting of per-subcarrier powers and/or others. In addition, the examples shown in FIG. 5 may also be applicable, in some cases, although the scope of embodiments is not limited in this respect.

At operation 605, the STA 103 may receive an HE PPDU from an AP 102. In some embodiments, the HE PPDU may be of a format described regarding the method 400, although the scope of embodiments is not limited in this respect. The example HE PPDU formats 500 and/or 550 may be used, in some embodiments, and other frame formats may also be used in some cases.

At operation 610, the STA 103 may determine channel estimates based on the received HE PPDU. In some embodiments, the STA 103 may determine channel estimates of a group of HE subcarriers that includes legacy subcarriers and HE extension subcarriers. As an example, the channel estimates of the legacy subcarriers may be based at least partly on L-LTF pilot symbols mapped to the legacy subcarriers during an L-LTF symbol period of the HE PPDU. In addition, the channel estimates of the HE extension subcarriers may be based at least partly on L-SIG extension pilot symbols mapped to the HE extension subcarriers during an L-SIG symbol period of the HE PPDU.

The channel estimates may be determined, in some cases, based on matched per-subcarrier transmission powers of the L-LTF pilot symbols and the L-SIG extension pilot symbols.

That is, the HE PPDU may be transmitted, by the AP 102, in accordance with a format in which powers per-subcarrier of the L-LTF pilot symbols and the L-SIG extension pilot symbols are matched (and/or scaled to match). Other scaling may be applicable to the HE PPDU, and the channel estimation may be determined based on such scaling. For instance, scaling of data symbols and/or pilot symbols of any symbol period in accordance with a target power for the symbol period and/or normalization restriction for the symbol period may be taken into account as part of the determination of the channel estimates.

At operation 615, the STA 103 may decode an L-SIG of the HE PPDU. In some embodiments, the STA 103 may decode, in accordance with the channel estimates of the legacy subcarriers, L-SIG legacy symbols mapped to the legacy subcarriers in an L-SIG symbol period of the HE PPDU. At operation 620, the STA 103 may decode an HE-SIG of the HE PPDU. In some embodiments, the STA 103 may decode, in accordance with the channel estimates of the HE subcarriers, HE-SIG symbols mapped to the HE subcarriers in an HE-SIG symbol period of the HE PPDU. At operation 625, the STA 103 may decode one or more data fields of the HE PPDU. In some embodiments, the STA 103 may decode, in accordance with the channel estimates of the HE subcarriers, one or more HE data fields that may be based on HE data symbols and/or HE pilot symbols mapped to the HE subcarriers in one or more symbol periods of the HE PPDU. For instance, one or more HE data symbol periods may be included in the HE PPDU after the HE-SIG symbol period(s).

At operation 630 of the method 600, the STA 103 may contend for access to a wireless medium. At operation 635, the STA 103 may scale pilot subcarriers, data subcarriers and/or other subcarriers of an uplink HE PPDU that is to be transmitted to the AP 102. At operation 640, the STA 103 may transmit the uplink HE PPDU to the AP 102. Techniques for scaling described herein and/or HE PPDU formats described herein may be used, in some embodiments, for the uplink HE PPDU.

In Example 1, an apparatus of an access point (AP) may comprise memory. The apparatus may further comprise processing circuitry. The processing circuitry may be configured to encode, for transmission, a legacy long training field (L-LTF) based on L-LTF pilot symbols mapped to a group of legacy subcarriers. The processing circuitry may be further configured to scale a per-subcarrier power for a group of legacy signal (L-SIG) extension pilot symbols to match a per-subcarrier power of the L-LTF pilot symbols. The processing circuitry may be further configured to encode, for transmission, an L-SIG field based on L-SIG legacy symbols mapped to the legacy subcarriers and further based on the scaled L-SIG extension pilot symbols mapped to a group of high efficiency (HE) extension subcarriers. The processing circuitry may be further configured to encode, for transmission, an HE signal field (HE-SIG) based on HE-SIG symbols mapped to a group of HE subcarriers that includes the legacy subcarriers and the HE extension subcarriers. The processing circuitry may be further configured to generate, for transmission, an HE physical layer convergence procedure (PLCP) protocol data unit (PPDU) to include the L-LTF, the L-SIG, and the HE-SIG.

In Example 2, the subject matter of Example 1, wherein the L-SIG extension pilot symbols may enable a determination of an extended channel estimate of both the legacy subcarriers and the HE extension subcarriers in comparison to a legacy channel estimate of the legacy subcarriers based on the L-LTF pilot symbols.

In Example 3, the subject matter of one or any combination of Examples 1-2, wherein the processing circuitry may be further configured to generate the HE PPDU for transmission in channel resources of 20 MHz. The channel resources may include 64 subcarriers of 312.5 kHz. The channel resources may include a lower guard band at a lower edge of the channel resources, followed by two HE extension subcarriers, followed by 26 legacy subcarriers, followed by a DC subcarrier, followed by 26 legacy subcarriers, followed by two HE extension subcarriers, followed by an upper guard band at an upper edge of the channel resources.

In Example 4, the subject matter of one or any combination of Examples 1-3, wherein the processing circuitry may be further configured to boost the per-subcarrier power of the L-SIG extension pilot symbols, with respect to a per-subcarrier power of the L-SIG legacy symbols, to match the per-subcarrier power of the L-LTF pilot symbols.

In Example 5, the subject matter of one or any combination of Examples 1-4, wherein the L-SIG may be encoded for transmission during an L-SIG symbol period of the HE PPDU. The processing circuitry may be further configured to scale the per-subcarrier power of the L-SIG legacy symbols based on the per-subcarrier power of the L-SIG extension pilot symbols and a normalized power restriction for the L-SIG symbol period.

In Example 6, the subject matter of one or any combination of Examples 1-5, wherein the L-LTF may be encoded for transmission during an L-LTF symbol period of the HE PPDU. The L-SIG may be encoded for transmission during an L-SIG symbol period of the HE PPDU that follows the L-LTF symbol period. The processing circuitry may be further configured to scale the per-subcarrier power of the L-LTF pilot symbols in accordance with a target symbol power for the L-LTF symbol period. The processing circuitry may be further configured to scale the per-subcarrier power of the L-SIG extension pilot symbols and the per-subcarrier power of the L-SIG legacy symbols in accordance with a target symbol power for the L-SIG symbol period.

In Example 7, the subject matter of one or any combination of Examples 1-6, wherein the HE subcarriers may be of a predetermined bandwidth of 312.5 kHz and may be included in channel resources of 20 MHz. The group of legacy subcarriers may include 52 subcarriers and the group of HE extension subcarriers may include four subcarriers. The L-SIG may be based on 52 legacy symbols and four L-SIG extension pilot symbols. The L-LTF may be based on 52 L-LTF pilot symbols.

In Example 8, the subject matter of one or any combination of Examples 1-7, wherein when the HE PPDU is generated for a normal mode: the target symbol power of the L-LTF symbol period may be equal to the target symbol power for the L-SIG symbol period; the processing circuitry may be further configured to scale the per-subcarrier power of the L-LTF pilot symbols and the per-subcarrier power of the L-SIG extension pilot symbols by a factor of 1/52 with respect to the target symbol power for the L-LTF; and the processing circuitry may be further configured to scale the per-subcarrier power of the L-LTF legacy symbols by a product of 1/52 and 48/52 with respect to the target symbol power for the L-LTF.

In Example 9, the subject matter of one or any combination of Examples 1-8, wherein when the HE PPDU is generated for an extended coverage mode: the target symbol power of the L-LTF symbol period may be twice the target symbol power for the L-SIG symbol period; the processing circuitry may be further configured to scale the per-subcarrier power of the L-LTF pilot symbols and the per-subcarrier power of the L-SIG extension pilot symbols by a factor of 1/52 with respect to the target symbol power for the L-LTF; and the processing circuitry may be further configured to scale the per-subcarrier power of the L-LTF legacy symbols by a product of 1/52 and 44/52 with respect to the target symbol power for the L-LTF.

In Example 10, the subject matter of one or any combination of Examples 1-9, wherein the HE-SIG may be encoded for transmission during an HE-SIG symbol period of the HE PPDU. The processing circuitry may be further configured to, when the HE PPDU is generated for transmission in an extended coverage mode: boost the target symbol power for the L-LTF symbol period by three decibels (dB) relative to a target symbol power of the HE-SIG; scale the per-subcarrier power of the L-SIG extension pilot symbols to match the per-subcarrier power of the L-LTF pilot symbols; and scale the legacy symbols of the L-SIG to a per-subcarrier power that is three dB lower than the per-subcarrier power of the L-LTF pilot symbols.

In Example 11, the subject matter of one or any combination of Examples 1-10, wherein the HE-SIG may be an HE-SIG-A field or an HE-SIG-B field. The L-SIG may be an L-SIG field or a repeated L-SIG (RL-SIG) field. The HE PPDU may include the L-LTF in a first symbol period, an L-SIG following the L-LTF, an RL-SIG following the L-SIG, an HE-SIG-A following the RL-SIG, and an HE-SIG-B following the HE-SIG-A.

In Example 12, the subject matter of one or any combination of Examples 1-11, wherein the HE-SIG symbols may be based on control information for one or more HE data fields included in the HE PPDU. The processing circuitry may be further configured to scale a per-subcarrier power of the HE-SIG symbols to match the per-subcarrier power of the L-LTF pilot symbols and the per-subcarrier power of the L-SIG extension pilot symbols.

In Example 13, the subject matter of one or any combination of Examples 1-12, wherein the processing circuitry may be further configured to contend for a wireless medium during a contention period to receive exclusive control of the medium during a transmission opportunity (TXOP). The HE PPDU may be transmitted during the TXOP.

In Example 14, the subject matter of one or any combination of Examples 1-13, wherein the processing circuitry may include a baseband processor to generate the HE PPDU.

In Example 15, the subject matter of one or any combination of Examples 1-14, wherein the apparatus may further include a transceiver to transmit the HE PPDU.

In Example 16, a non-transitory computer-readable storage medium may store instructions for execution by one or more processors to perform operations for communication by an access point (AP). The operations may configure the one or more processors to encode, for transmission as part of a high-efficiency (HE) physical layer convergence procedure (PLCP) protocol data unit (PPDU), a legacy long training field (L-LTF) based on L-LTF pilot symbols mapped to a group of legacy subcarriers during an L-LTF symbol period. The operations may further configure the one or more processors to encode, for transmission as part of the HE PPDU, a legacy signal field (L-SIG) based on L-SIG legacy symbols mapped to the legacy subcarriers during an L-SIG symbol period and further based on L-SIG extension pilot symbols mapped to a group of HE extension subcarriers during the L-SIG symbol period. The operations may further configure the one or more processors to match per-subcarrier powers of the L-SIG extension pilot symbols and the L-LTF pilot symbols. The operations may further configure the one or more processors to scale the L-SIG legacy symbols and L-SIG extension pilot symbols in accordance with a normalized power restriction for the L-SIG symbol period.

In Example 17, the subject matter of Example 16, wherein the operations may further configure the one or more processors to encode, for transmission as part of the HE PPDU, an HE signal field (HE-SIG) based on HE-SIG symbols mapped to the legacy subcarriers and the HE extension subcarriers during an HE-SIG symbol period. The HE-SIG symbols may be based on control information for one or more HE data fields included in the HE PPDU.

In Example 18, the subject matter of one or any combination of Examples 16-17, wherein the L-SIG extension pilot symbols may enable an extension, by a station (STA), of a legacy channel estimate of the legacy subcarriers based on the L-LTF pilot symbols to include a channel estimate of the HE extension subcarriers.

In Example 19, a method of communication by an access point (AP) may comprise generating, for transmission, a high-efficiency (HE) physical layer convergence procedure (PLCP) protocol data unit (PPDU) that includes a legacy long training field (L-LTF), a legacy signal field (L-SIG), and an HE signal field (HE-SIG). The L-LTF may be based on L-LTF pilot symbols mapped to a group of legacy subcarriers. The HE-SIG may be based on HE-SIG symbols mapped to a group of HE subcarriers that includes the legacy subcarriers and a group of HE extension subcarriers. The L-SIG may be based on L-SIG legacy symbols mapped to the legacy subcarriers and may be further based on L-SIG extension pilot symbols mapped to the HE extension subcarriers. A per-subcarrier power of the L-SIG extension pilot symbols may be scaled to match a per-subcarrier power of the L-LTF pilot symbols.

In Example 20, the subject matter of Example 19, wherein the L-SIG extension pilot symbols may enable a determination of an extended channel estimate of both the legacy subcarriers and the HE extension subcarriers in comparison to a legacy channel estimate of the legacy subcarriers based on the L-LTF pilot symbols.

In Example 21, an apparatus of a station (STA) may comprise memory. The apparatus may further comprise processing circuitry. The processing circuitry may be configured to determine, based on a high-efficiency (HE) physical layer convergence procedure (PLCP) protocol data unit (PPDU) received from an access point (AP), channel estimates of a group of HE subcarriers that includes legacy subcarriers and HE extension subcarriers. The processing circuitry may be further configured to decode, in accordance with the channel estimates, an HE signal field (HE-SIG) based on HE-SIG symbols mapped to the HE subcarriers. The channel estimates of the legacy subcarriers may be based at least partly on legacy long training field (L-LTF) pilot symbols of an L-LTF of the HE PPDU. The channel estimates of the HE extension subcarriers may be based on legacy signal field (L-SIG) extension pilot symbols of an L-SIG of the HE PPDU. The channel estimates may be determined based on matched per-subcarrier transmission powers of the L-LTF pilot symbols and the L-SIG extension pilot symbols.

In Example 22, the subject matter of Example 21, wherein the L-LTF pilot symbols may be mapped to the legacy subcarriers in an L-LTF symbol period of the HE PPDU. The L-SIG extension pilot symbols may be mapped to the HE extension subcarriers in an L-SIG symbol period of the HE PPDU that follows the L-LTF symbol period. HE-SIG symbols may be mapped to the HE subcarriers in an HE-SIG symbol period of the HE PPDU that follows the L-SIG symbol period. The processing circuitry may be further configured to decode, in accordance with the channel estimates of the legacy subcarriers, L-SIG legacy symbols mapped to the legacy subcarriers in the L-SIG symbol period.

In Example 23, the subject matter of one or any combination of Examples 21-22, wherein the HE PPDU may be received in channel resources of 20 MHz. The channel resources may include 64 subcarriers of 312.5 kHz. The channel resources may include a lower guard band at a lower edge of the channel resources, followed by two HE extension subcarriers, followed by 26 legacy subcarriers, followed by a DC subcarrier, followed by 26 legacy subcarriers, followed by two HE extension subcarriers, followed by an upper guard band at an upper edge of the channel resources.

In Example 24, the subject matter of one or any combination of Examples 21-23, wherein the processing circuitry may include a baseband processor to determine the channel estimates and to decode the HE-SIG.

In Example 25, the subject matter of one or any combination of Examples 21-24, wherein the apparatus may further include a transceiver to receive the HE PPDU.

In Example 26, an apparatus of an access point (AP) may comprise means for encoding, for transmission as part of a high-efficiency (HE) physical layer convergence procedure (PLCP) protocol data unit (PPDU), a legacy long training field (L-LTF) based on L-LTF pilot symbols mapped to a group of legacy subcarriers during an L-LTF symbol period. The apparatus may further comprise means for encoding, for transmission as part of the HE PPDU, a legacy signal field (L-SIG) based on L-SIG legacy symbols mapped to the legacy subcarriers during an L-SIG symbol period and further based on L-SIG extension pilot symbols mapped to a group of HE extension subcarriers during the L-SIG symbol period. The apparatus may further comprise means for matching per-subcarrier powers of the L-SIG extension pilot symbols and the L-LTF pilot symbols. The apparatus may further comprise means for scaling the L-SIG legacy symbols and L-SIG extension pilot symbols in accordance with a normalized power restriction for the L-SIG symbol period.

In Example 27, the subject matter of Example 26, wherein the apparatus may further comprise means for encoding, for transmission as part of the HE PPDU, an HE signal field (HE-SIG) based on HE-SIG symbols mapped to the legacy subcarriers and the HE extension subcarriers during an HE-SIG symbol period. The HE-SIG symbols may be based on control information for one or more HE data fields included in the HE PPDU.

In Example 28, the subject matter of one or any combination of Examples 26-27, wherein the L-SIG extension pilot symbols may enable an extension, by a station (STA), of a legacy channel estimate of the legacy subcarriers based on the L-LTF pilot symbols to include a channel estimate of the HE extension subcarriers.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station (STA) (HE STA), the apparatus comprising:
   processing circuitry, and memory, the processing circuitry configured to:
   encode an HE physical layer (PHY) protocol data unit (PPDU) for transmission, the HE PPDU to include:
   a legacy short training field (L-STF);
   a legacy long training field (L-LTF) to follow the L-STF,
   a legacy signal field (L-SIG) to follow the L-LTF;
   a repeat legacy signal field (RL-SIG) to follow the L-SIG; and
   an HE signal A field (HE-SIG-A) to follow the RL-SIG,
   wherein the L-SIG and the RL-SIG each comprise a total of 56 subcarriers, the 56 subcarriers include four additional reference subcarriers in addition to a legacy number of subcarriers,
   wherein the HE-SIG-A comprises a total number of 56 subcarriers, the 56 subcarriers including four subcarriers corresponding to the four additional reference subcarriers of the L-SIG and the RL-SIG,
   wherein the L-LTF comprises a total number of 52 subcarriers, configure the HE PPDU for transmission,
   wherein the HE STA is configurable for transmission of HE PPDUs that are configured for extended range (ER) and HE PPDUs that are not configured for extended range,
   wherein to configure the HE PPDU for extended range, the processing circuitry is to cause transceiver circuitry to apply at least approximately a 3 dB power boost to the L-STF, to the L-LTF, to the four additional reference subcarriers of the L-SIG, and to the four additional reference subcarriers of the RL-SIG, the 3 dB power boost being relative to a transmission power for a HE PPDU that is not configured for extended range.

2. The apparatus of claim 1, wherein for an HE PPDU that is not configured for ER, the processing circuitry is to maintain a transmission power for the L-STF, the L-LTF, the four additional reference subcarriers of the L-SIG, and the four additional reference subcarriers of the RL-SIG.

3. The apparatus of claim 1 wherein the four additional reference subcarriers of the L-SIG and the RL-SIG each comprising two subcarriers at each edge a 20 MHz channel.

4. The apparatus of claim 3, wherein the four subcarriers of the HE-SIG-A corresponding to the four additional reference subcarriers of the L-SIG and the RL-SIG correspond in frequency to the four additional reference subcarriers of the L-SIG and the RL-SIG.

5. The apparatus of claim 1, wherein the at least approximately 3 dB power boost is approximately a 3 dB power boost.

6. The apparatus of claim 1 wherein the at least approximately 3 dB power boost that is applied to the L-STF, to the L-LTF, to the four additional reference subcarriers of the L-SIG, and to the four additional reference subcarriers of the RL-SIG, is approximately twice a transmission power for the L-STF, the L-LTF, the four additional reference subcarriers of the L-SIG, and the four additional reference subcarriers of the RL-SIG of a HE PPDU that is not configured for extended range.

7. The apparatus of claim 4 wherein for an HE PPDU that is configured for extended range (ER), a symbol period of the HE-SIG-A is lengthened.

8. The apparatus of claim 2 wherein for an HE PPDU that is configured for extended range, the processing circuitry is to cause transceiver circuitry to apply the at least approximately 3 dB power boost to the L-STF, to the L-LTF, to the four additional reference subcarriers of the L-SIG, and to the four additional reference subcarriers of the RL-SIG, the 3 dB power boost being approximately 3 dB above a target symbol power for the subcarriers of the HE-SIG-A.

9. The apparatus of claim 1 wherein the processing circuitry is further configured to store at least a portion of the HE-PPDU in the memory, and
wherein the processing circuitry comprises a baseband processor.

10. The apparatus of claim 7 further comprising the transceiver circuitry coupled to the baseband processor, and wherein the transceiver circuitry is further coupled to two or more antennas.

11. A method for extended range communication performed by processing circuitry of a high-efficiency (HE) station (STA) (HE STA), the method comprising:
encoding an HE physical layer (PHY) protocol data unit (PPDU) for transmission, the HE PPDU to include:
a legacy short training field (L-STF);
a legacy long training field (L-LTF) to follow the L-STF,
a legacy signal field (L-SIG) to follow the L-LTF;
a repeat legacy signal field (RL-SIG) to follow the L-SIG; and
an HE signal A field (HE-SIG-A) to follow the RL-SIG,
wherein the L-SIG and the RL-SIG each comprise a total of 56 subcarriers, the 56 subcarriers include four additional reference subcarriers in addition to a legacy number of subcarriers,
wherein the HE-SIG-A comprises a total number of 56 subcarriers, the 56 subcarriers including four subcarriers corresponding to the four additional reference subcarriers of the L-SIG and the RL-SIG,
wherein the L-LTF comprises a total number of 52 subcarriers, configuring the HE PPDU for transmission,
wherein the HE STA is configurable for transmission of HE PPDUs that are configured for extended range (ER) and HE PPDUs that are not configured for extended range,
wherein to configure the HE PPDU for extended range, the method further comprises signaling transceiver circuitry to apply at least approximately a 3 dB power boost to the L-STF, to the L-LTF, to the four additional reference subcarriers of the L-SIG, and to the four additional reference subcarriers of the RL-SIG, the 3 dB power boost being relative to a transmission power for a HE PPDU that is not configured for extended range.

12. The method of claim 11, wherein for an HE PPDU that is not configured for ER, the processing circuitry is to maintain a transmission power for the L-STF, the L-LTF, the four additional reference subcarriers of the L-SIG, and the four additional reference subcarriers of the RL-SIG.

13. The method of claim 11 wherein the four additional reference subcarriers of the L-SIG and the RL-SIG each comprising two subcarriers at each edge a 20 MHz channel.

14. The method of claim 13, wherein the four subcarriers of the HE-SIG-A corresponding to the four additional reference subcarriers of the L-SIG and the RL-SIG correspond in frequency to the four additional reference subcarriers of the L-SIG and the RL-SIG.

15. The method of claim 11, wherein the at least approximately 3 dB power boost is approximately a 3 dB power boost.

16. The method of claim 11 wherein the at least approximately 3 dB power boost that is applied to the L-STF, to the L-LTF, to the four additional reference subcarriers of the L-SIG, and to the four additional reference subcarriers of the RL-SIG, is approximately twice a transmission power for the L-STF, the L-LTF, the four additional reference subcarriers of the L-SIG, and the four additional reference subcarriers of the RL-SIG of a HE PPDU that is not configured for extended range.

17. A non-transitory computer-readable storage medium that stores instructions for execution by processing circuitry of a high-efficiency (HE) station (STA) (HE STA) to configure the RE STA to:
encode an HE physical layer (PHY) protocol data unit (PPDU) for transmission, the HE PPDU to include:
a legacy short training field (L-STF);
a legacy long training field (L-LTF) to follow the L-STF,
a legacy signal field (L-SIG) to follow the L-LTF;
a repeat legacy signal field (RL-SIG) to follow the L-SI; and
an HE signal A field (HE-SIG-A) to follow the RL-SIG,
wherein the L-SIG and the RL-SIG each comprise a total of 56 subcarriers, the 56 subcarriers include four additional reference subcarriers in addition to a legacy number of subcarriers,
wherein the HE-SIG-A comprises a total number of 56 subcarriers, the 56 subcarriers including four subcarriers corresponding to the four additional reference subcarriers of the L-SIG and the RL-SIG,
wherein the L-LTF comprises a total number of 52 subcarriers, configure the HE PPDU for transmission,
wherein the HE STA is configurable for transmission of HE PPDUs that are configured for extended range (ER) and HE PPDUs that are not configured for extended range,
wherein to configure the HE PPDU for extended range, the processing circuitry is to cause transceiver circuitry to apply at least approximately a 3 dB power boost to the L-STF, to the L-LTF, to the four additional reference subcarriers of the L-SIG, and to the four additional reference subcarriers of the RL-SIG, the 3 dB power boost being relative to a transmission power for a HE PPDU that is not configured for extended range.

18. The non-transitory computer-readable storage medium of claim 17, wherein for an HE PPDU that is not configured for ER, the processing circuitry is to maintain a transmission power for the L-STF, the L-LTF, the four additional reference subcarriers of the L-SIG, and the four additional reference subcarriers of the RL-SIG.

19. The non-transitory computer-readable storage medium of claim 17 wherein the four additional reference subcarriers of the L-SIG and the RL-SIG each comprising two subcarriers at each edge a 20 MHz channel.

20. The non-transitory computer-readable storage medium of claim 19, wherein the four subcarriers of the HE-SIG-A corresponding to the four additional reference subcarriers of the L-SIG and the RL-SIG correspond in frequency to the four additional reference subcarriers of the L-SIG and the RL-SIG.

* * * * *

UNITED STATES PATENT AND TRADEMARK OFFICE
CERTIFICATE OF CORRECTION

PATENT NO. : 10,405,273 B2
APPLICATION NO. : 15/915950
DATED : September 3, 2019
INVENTOR(S) : Chen et al.

Page 1 of 1

It is certified that error appears in the above-identified patent and that said Letters Patent is hereby corrected as shown below:

In the Claims

In Column 24, Line 13, In Claim 17, delete "RE" and insert --HE-- therefor

Signed and Sealed this
Thirty-first Day of March, 2020

Andrei Iancu
*Director of the United States Patent and Trademark Office*